Jan. 1, 1929.
W. E. DOWD, JR
1,697,591
REGENERATIVE AIR HEATER
Filed April 24, 1924     2 Sheets-Sheet 2
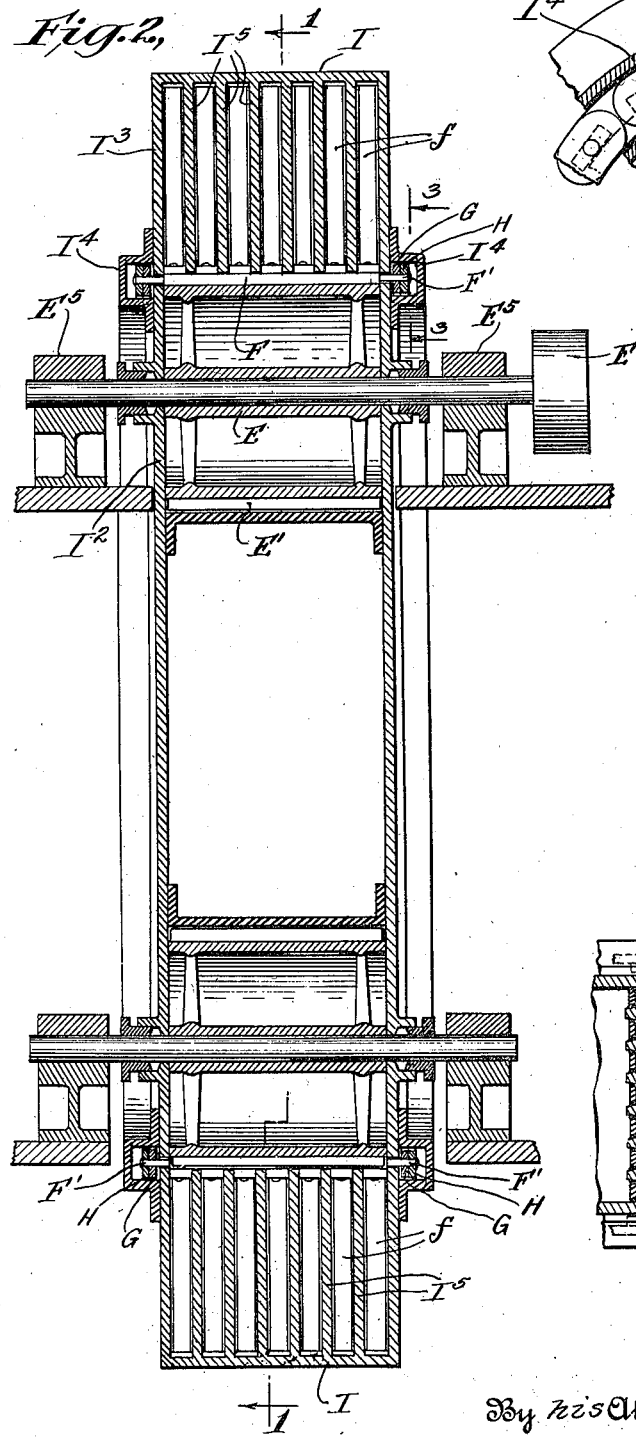
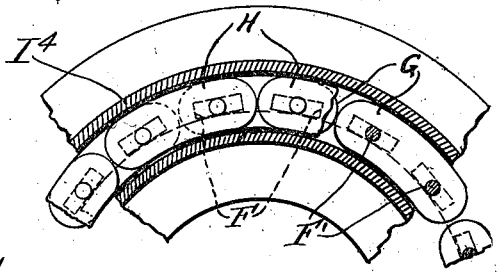
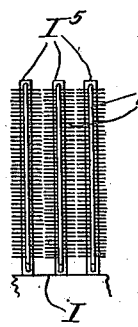
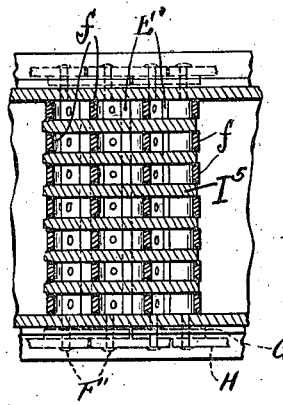
Inventor
Wyllys E. Dowd, Jr.
By his Attorney
John E. Hubbell Patented Jan. 1, 1929.

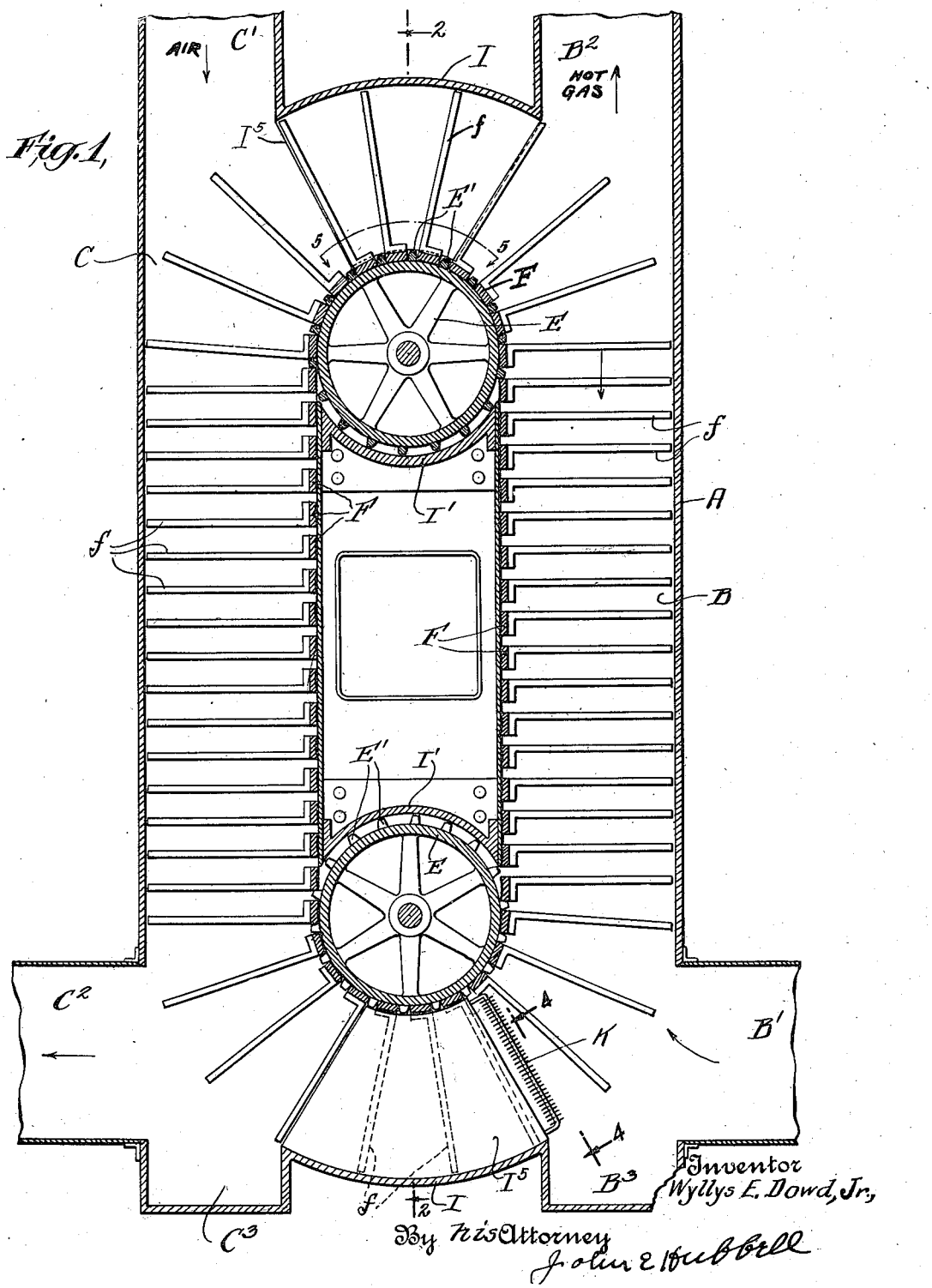

1,697,591

UNITED STATES PATENT OFFICE.

WYLLYS E. DOWD, JR., OF NEW YORK, N. Y., ASSIGNOR TO POWER SPECIALTY COMPANY, OF NEW YORK, N. Y., A CORPORATION OF NEW YORK.

REGENERATIVE AIR HEATER.

Application filed April 24, 1924. Serial No. 708,670.

The general object of my present invention is to provide improved means for effecting a transfer of heat between two gaseous fluids, and the invention was primarily devised, and is especially adapted for use in transferring heat from the heating gases leaving a boiler furnace to the air passed to the furnace to support combustion therein.

In proceeding in accordance with the present invention, I utilize a heat absorbing and dispensing medium, such as cast iron, to alternately contact with and absorb heat from the hotter gas and to contact with and give up absorbed heat to the cooler gas. To this end, I provide a travelling belt or conveyor which is formed by or supports the heat absorbing and dispensing material, and arrange one run or side of the belt in a conduit through which the fluid to be heated is passed and arrange the other side of the belt in a conduit alongside the first mentioned conduit through which the gas furnishing the heat passes, suitable provisions being made to prevent or minimize leakage into or out of each conduit where the belt enters and leaves the latter. By proceeding in this manner and having the travel of the portion of the belt in each conduit opposite in direction to the travel of the gas therethrough, I am enabled to take full advantage of the countercurrent principle and can effect a very large and efficient transfer of heat with apparatus of given bulk and weight. The provisions for mounting the belt and giving it its motion may be comparatively simple and inexpensive, and leakage into and out of the conduits can be kept small enough to be practically unimportant without the use of expensive reversing or other valves.

The various features of novelty which characterize my invention are pointed out with particularity in the claims annexed to and forming a part of this specification. For a better understanding of the invention, its advantages and the specific object obtained with its use, reference should be had to the accompanying drawings and descriptive matter in which I have illustrated and described a preferred embodiment of my invention.

On the drawings:

Fig. 1 is an elevation in section on the line 1—1 of Fig. 2;

Fig. 2 is a section on the line 2—2 of Fig. 1;

Fig. 3 is a partial section on the line 3—3 of Fig. 2 with some of the conveyor links omitted;

Fig. 4 is an elevation or projection on the plane 4—4 see Fig. 1, of a portion of the apparatus; and Fig. 5 is a developed section on the line 5—5 of Fig. 1 of a portion of the apparatus.

The heat exchanger or regenerator A illustrated in the drawings, comprises a conduit B shown as vertically disposed, though it may be horizontal, and having an inlet B' at its lower end for the flue gases leaving the boiler, and an outlet $B^2$ at its opposite end which will ordinarily be connected to a draft inducing fan or stack. Alongside the conduit B is a generally similar conduit C with an inlet C' for the air to be preheated at its upper end, and an outlet $C^2$ at the opposite end through which the preheated air passes to the combustion chamber of the furnace. The conduits C and B are connected adjacent the gas inlet B' and hot air outlet $C^2$ by a transverse conduit the lower wall of which is formed by a cylindrical segment I and the upper wall of which is formed by a cylindrical segment I' each with its concave side toward the other. A similar transverse conduit having upper and lower walls I and I' respectively, connect the conduits B and C adjacent the air inlet C' and flue gas outlet $B^2$.

Mounted in each transverse conduit is a conveyor pulley E, over which runs the belt or conveyor formed by or carrying the heat absorbing and dispensing material. As shown, this belt is formed by metal bars F having pintle-like end portions F', the pintle portions F' of each bar being linked to the pintle portions F' of the adjacent bars F by links G and H. The bars F successively engage the peripheries of the pulleys E, one of which is rotated as by means of a belt running over the pulley $E^6$ secured to the pulley shaft. As shown, each of the pulleys E is provided with longitudinal ribs or teeth E' which enter the spaces between the adjacent bars F as the belt passes over the pulley. The bars F form part of the heat absorbing and dispensing material of the conveyor but the main portion of this material is formed, in the construction shown by bars or arms $f$ of cast iron which are riveted or otherwise secured to the bars F, each arm $f$ extending transversely to the direction of movement of the bar F on which it is supported. One side of the belt lies within the conduit B and the other side lies within the conduit C. To prevent or minimize leakage into or out of the conduits B and C at the points where the belts enter and leave the said conduits, each of the walls I' is co-axial with and fits as snugly about the corresponding pulley E as is practically possible with the clearance necessary to avoid an abrasive or friction producing contact between the pulley and the wall. Each of the walls I is also co-axial with the corresponding pulley and is so spaced away from the pulley axis that the outer ends of the arms $f$ will sweep along the inner surface of the wall I as these arms travel about the pulley. The arms $f$ carried by each of the various bars F are similarly spaced apart to provide a flow space, and in passing around either pulley E from one of the conduits B and C to the other, the arms $f$ travel between plate-like parts or vanes $I^5$ which are shown as formed integrally with the corresponding wall sections I, though they may be separable therefrom. The inner end of each sector-shaped vane $I^5$ is curved and fits snugly against the outer ends of the teeth E' of the corresponding pulley E and the bars F resting on the pulley between those teeth. Advantageously, the edges of the vanes $I^5$ at which the arms $f$ enter the spaces between the vanes are bevelled as shown in Fig. 5.

The conveyor links H and G and the pintle portions F' connected thereby are shown as travelling in grooves in the end walls of the regenerator casing. The walls of these grooves are formed in the construction illustrated by channel bars $I^4$ secured to the end walls of the casing. To minimize leakage through the channels $I^4$ the links G and H are advantageously in the form of arcs the inner and outer edges of which are curved to conform to the curved portions of the corresponding walls of the channel bars $I^4$. The links advantageously have their end portions extended and shaped so that the rounded ends of each link H extend into, or nearly into contact with the adjacent ends of the adjacent links H, the links G being similarly extended.

While the heat exchanger may be vertically or horizontally disposed, when it is vertically disposed, as illustrated in the drawings, I advantageously provide dust pockets $B^3$ and $C^3$ in each conduit B and C respectively adjacent the lower end of the heat exchanger to collect dust settling out of the gases passing through the conduits. Ordinarily, of course, all, or practically all of the dust settling out comes from the flue gases and first settles on the arms $f$ as the latter pass downward through the conduit B, the dust collecting in the pocket $C^3$ dropping off the arms $f$ as the latter pass around the under side of the lower pulley E. To facilitate the removal of dust from the arms $f$, I may provide brushes K, as shown in Figs. 1 and 4.

The brushes K are wire brushes, the rod-like cores of which have off-set ends secured to the adjacent edges of the vanes $I^5$.

With the described construction, leakage between the conduits B and C can be kept comparatively small, and if the air and gas moving fans are properly correlated for the purpose so that the pressures in the lower ends of the two conduits B and C are substantially equal, the only leakage between the conduits will be from the upper end of the conduit C into the upper end of the conduit B. Such leakage neither dilutes the air passing to the furnace combustion chamber nor affects the temperature to which that air is preheated.

With the regenerative material formed of comparatively small parts of metal as described, the relatively large surface and high thermal conductivity of the regenerative material insures an efficient heat transfer with apparatus of relatively small bulk and weight.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Apparatus for transferring heat from a fluid in one conduit to a second fluid in an adjacent conduit, comprising regenerative material and means for moving it along a closed path, one portion of which is located in, and extends longitudinally of one of said conduits, while another portion is located in, and extends longitudinally of the other conduit.

2. Apparatus for transferring heat from a fluid in one container to a fluid in an adjacent container comprising regenerative material linked together to form a continuous travelling belt with a portion located in each of said chambers.

3. Apparatus for transferring heat from one fluid to another comprising a pair of conduits, one for each of said fluids, regenerative material linked together to form a continuous travelling belt with a portion in each of said conduits, and provision for causing one of the fluids to flow through one of said conduits and causing the other fluid to flow through the other conduit each in a direction opposite to the direction of travel of the regenerative material therein.

4. Apparatus for transferring heat from one fluid to another comprising a pair of adjacent conduits, transverse connections between the conduits, said connections being spaced apart longitudinally of said conduits, and regenerative material mounted to move along a continuous path, including said transverse connections and the intervening portions of the two conduits.

5. Apparatus for transferring heat from one fluid to another comprising a pair of adjacent conduits, spaced apart transverse connections between the conduits, a belt like regenerator mounted to move along a continuous path, including said transverse connections and the intervening portions of the tube conduits, and means for passing one of said fluids through one of said conduits and the other of said fluids through the other conduit each in a direction of travel opposed to that of the portion of the conveyor in the conduit.

6. Apparatus for transferring heat from one fluid to another comprising a pair of conduits, one for each of said fluids, and spaced-apart transverse connections between the conduits, regenerative material linked together to form a continuous travelling belt extending through said transverse connecting portions and the portions of the conduit between said transverse connections and comprising arms arranged in spaced-apart rows running parallel to the length of belt travel, and vanes in said transverse connections projecting between the rows of arms to restrict leakage from one conduit to another.

7. Apparatus for transferring heat from one fluid to another comprising a pair of conduits, spaced-apart conduit connections between said conduits, a pair of pulleys located one in each of said connections, a chain conveyor running over said pulleys and between the latter through said conduits, regenerative material in the form of arms secured to said conveyor and extending upward from the latter, each of said conduit connections having opposed internally concave walls, one fitting about the periphery of the corresponding pulley at the side of the latter adjacent the other pulley, and the other being curved about the pulley axis and swept by the other ends of said arms as the latter travel over the pulley.

8. Apparatus for transferring heat from one fluid to another comprising a pair of conduits, spaced-apart conduit connections between said conduits, a pair of pulleys located one in each of said conduit connections, a chain conveyor running over said pulleys and between the latter through the first mentioned conduits, regenerative material in the form of arms secured to said conveyor and extending upward from the latter and arranged in rows longitudinal of the conveyor, each of said conduit connections having opposed internally concave walls, one fitting about the periphery of the corresponding pulley at the side of the latter adjacent the other pulley and the other curved about the pulley axis and swept by the outer ends of said arms as the latter travel over the pulley, and stationary vanes or partitions extending from the last mentioned wall toward the pulley in the spaces between said rows.

9. Apparatus for transferring heat from one fluid to another comprising a pair of conduits, spaced-apart conduit connections between said conduits, a pair of pulleys located one in each of said conduit connections, a chain conveyor running over said pulleys and between the latter through the first mentioned conduits, regenerative material in the form of arms secured to said conveyor and extending upward from the latter and arranged in rows longitudinal of the conveyor, each of said conduit connections having opposed internally concave walls, one fitting about the periphery of the corresponding pulley at the side of the latter adjacent the other pulley and the other curved about the pulley axis and swept by the outer ends of said arms as the latter travel over the pulley, and stationary vanes or partitions extending from the last mentioned wall toward the pulley in the spaces between said rows, and cleaning means engaged by said arms in their travel.

Signed at New York city, in the county of New York and State of New York, this 22nd day of April A. D. 1924.

WYLLYS E. DOWD, Jr.

CERTIFICATE OF CORRECTION.

Patent No. 1,697,591. Granted January 1, 1929, to

WYLLYS E. DOWD, JR.

It is hereby certified that the above numbered patent was erroneously issued to "Power Specialty Company, of New York, N. Y., a Corporation of New York", whereas said patent should have been issued to "Foster Wheeler Corporation, of New York, N. Y., a Corporation of New York", said corporation being assignee of the entire interest in said invention, as shown by the records of assignments in this office; and that the said Letters Patent should be read with this correction therein that the same may conform to the record of the case in the Patent Office.

Signed and sealed this 19th day of February, A. D. 1929.

(Seal)

M. J. Moore,
Acting Commissioner of Patents.